UNITED STATES PATENT OFFICE 2,394,042

TRIAZINE DERIVATIVES

Gaetano F. D'Alelio, Pittsfield, Mass., assignor to General Electric Company, a corporation of New York No Drawing. Application July 30, 1941, Serial No. 404,664

13 Claims. (Cl. 260—249.5)

This invention relates to new chemical compounds and more particularly to triazine derivatives. The invention especially is concerned with the production of new and useful ureido and thioureido triazines.

The triazine derivatives of this invention may be represented graphically by the following general formula:

I

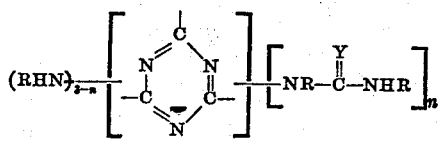

In the above formula $n$ is 1, Y represents a member of the class consisting of oxygen and sulfur, and R represents a member of the class consisting of hydrogen and monovalent hydrocarbon and halo-hydrocarbon radicals, numerous examples of which hereafter are given.

Illustrative examples of monovalent radicals that R in the above formula may represent are aliphatic (e. g., methyl, ethyl, propyl, isopropyl, allyl, butyl, secondary butyl, isobutyl, butenyl, amyl, isoamyl, hexyl, etc.); including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlorophenyl, chlorcyclohexyl, chlormethyl, dichlorphenyl, ethyl chlorphenyl, phenyl chlorethyl, bromethyl, bromtolyl, etc. Preferably R is hydrogen.

The new triazine derivatives of this invention may be used as intermediates in the preparation of derivatives thereof such as carbamic esters, salts of carbamic acid, etc., of the individual ureido or thioureido triazine. The chemical compounds of this invention are especially valuable in the preparation of synthetic resinous compositions since they combine in one compound the advantages of the triazines and ureas. Thus, they may be condensed with, for instance, aldehydes, including polymeric aldehydes and aldehyde-addition products, to yield condensation products of particular utility in the plastics and coating arts. Such condensation products are more fully described and claimed in my copending application Serial No. 404,661, filed concurrently herewith, now Patent No. 2,312,688, issued March 2, 1943, and assigned to the same assignee as the present invention.

Various methods may be employed to produce the chemical compounds of this invention, as well as the di- and tri-ureido and -thioureido compounds. One suitable method comprises effecting reaction between a halogenated 1,3,5-triazine (that is, a symmetrical triazine having a halogen atom attached directly to a carbon atom of the triazine nucleus) and an alkali-metal derivative, advantageously the sodium derivative, of a urea or thiourea corresponding to the ureido or thioureido substituent to be introduced into the triazine nucleus. This reaction may be represented by the following general equation:

II

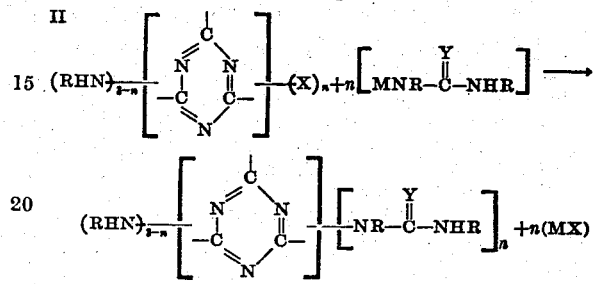

In the above equation X represents halogen, M represents an alkali metal (sodium, potassium, lithium, rubidium, caesium) R and Y have the same meanings as given above with reference to the general formula I for the triazine derivatives of this invention, and $n$ is 1, 2, or 3, there being no amino (—NHR) groups attached to the triazine nucleus when $n$ is 3. This reaction is carried out in a suitable anhydrous liquid medium, for example in ether, benzene, etc.

It will be understood, of course, by those skilled in the art that the choice of the starting reactants and the mol ratios thereof depend upon the particular end-products desired. Illustrative examples of halogenated 1,3,5-triazines that may be used, depending upon the particular product sought, are listed below:

2-chloro 4,6-diamino 1,3,5-triazine
2-chloro 4,6-di-(ethylamino) 1,3,5-triazine
2-bromo 4,6-diamino 1,3,5-triazine
2-chloro 4-ethylamino 6-amino 1,3,5-triazine
2-chloro 4-ethylamino 6-phenylamino 1,3,5-triazine
2-bromo 4-propylamino 6-cyclohexylamino 1,3,5-triazine
2,4-dichloro 6-amino 1,3,5-triazine
2,4,6-trichloro 1,3,5-triazine
2,4-dichloro 6-phenylamino 1,3,5-triazine
2,4-dibromo 6-amino 1,3,5-triazine
2,4,6-tribromo 1,3,5-triazine
2,4-dichloro 6-methylamino 1,3,5-triazine Illustrative examples of alkali-metal ureas and thioureas that may be employed, the choice depending upon the particular ureido or thioureido substituent to be introduced into the triazine nucleus, are the alkali-metal derivatives, e. g., the sodium and potassium derivatives, of the following ureas and thioureas:

Urea
Thiourea
Methyl urea
Ethyl urea
Allyl urea
Phenyl urea
Methyl thiourea
Ethyl thiourea
Phenyl thiourea
N,N'-diethyl urea
N,N'-diphenyl urea
N-ethyl N'-phenyl urea
N-ethyl N'-cyclohexyl urea
Chlorethyl urea
2-chlorallyl urea
Chlorethyl thiourea In order that those skilled in the art better may understand how the present invention may be carried into effect, the following illustrative examples thereof are given:

EXAMPLE 1

*Preparation of 2-ureido 4,6-diamino 1,3,5-triazine*

Equimolecular proportions of 2-chloro 4,6-diamino 1,3,5-triazine and sodium urea in ether, benzene or other suitable anhydrous liquid medium are stirred together for from 15 to 24 hours at or below room temperature. The reaction product (2-ureido 4,6-diamino 1,3,5-triazine) is filtered off, washed free of sodium chloride and dried. The following equation represents the reaction:

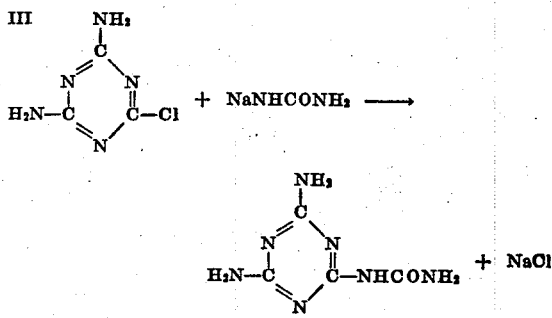

In another method of preparing the hereindescribed mono-ureido and -thioureido triazine derivatives, the amino derivatives of the 1,3,5-triazines are caused to react with cyanates, thiocyanates, isocyanates or isothiocyanates to yield the corresponding monoureido- or monothioureido-substituted products. For example, a polyamino 1,3,5-triazine is caused to react in aqueous solution under carefully controlled temperature conditions with a cyanate, thiocyanate, isocyanate or isothiocyanate, the reaction proceeding as represented by the following general equation:

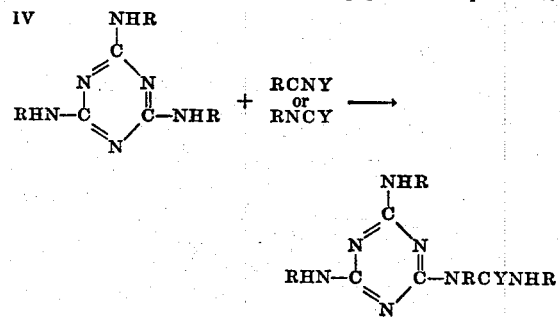

In the above equation R and Y have the same meanings as above given with reference to Formula I for the triazine derivatives of this invention.

When R in the formulas RCNY and RNCY represents hydrogen, the acids corresponding to the formulas HCNY and HNCY may be formed in situ by using an alkali-metal salt, an alkaline-earth salt or an ammonium salt of cyanic, isocyanic, thiocyanic or isothiocyanic acid and by carrying out the reaction in the presence of an organic or inorganic acid that is stronger than the salt of the normal or isocyanate (or iso-thiocyanate) employed, e. g., hydrochloric, hydrobromic, sulfuric, chloracetic, etc., acids. Alternatively, I may use as a starting reactant a preformed acid mono salt of the polyamino triazine, the acid used in the preparation of such salt likewise being stronger than the salt of the normal or iso-cyanate (or iso-thiocyanate) employed, e. g., a monohydrochloride, monohydrobromide, etc., of the polyamino triazine. Sodium, potassium, calcium and magnesium cyanates, isocyanates, thiocyanates and isothiocyanates are more specific examples of salts that may be used in carrying out the reaction with the polyamino triazine or acid salt thereof. More specific examples of compounds that may be employed when R in the formulas RCNY and RNCY is other than hydrogen are the methyl, ethyl, propyl, isopropyl, butyl, isobutyl, amyl, allyl, phenyl, chlorphenyl, etc., cyanates, isocyanates, thiocyanates and isothiocyanates. More specific examples of aminotriazines that may be used in preparing mono-ureido diamino triazines or mono-thioureido diamino triazines by the above-described method are: 2-amino 4,6-di-(ethylamino) 1,3,5-triazine; 2 - ethylamino 4,6 - di-(phenylamino) 1,3,5-triazine; 2,4,6-tri-(methylamino) 1,3,5-triazine; 2,4,6-tri-(ethylamino) 1,3,5-triazine; 2-amino 4-ethylamino 6-phenylamino 1,3,5-triazine; etc.

It was quite surprising and unexpected to find that mono-ureido and mono-thioureido triazines could be produced by the above method, since heretofore the production of other substituted ureido compounds from cyanates and isocyanates has been considered possible only when using strongly basic amino compounds as reactants, e. g., aniline, ethylene diamine, etc. In contrast with such strongly basic amino compounds the aminotriazines are practically neutral substances and in water solution have a pH close to 7.0.

The following example illustrates the production of 2-ureido 4,6-diamino 1,3,5-triazine by the above described method. All parts are by weight.

EXAMPLE 2

Sixty-five (65) parts melamine monohydrochloride were dissolved in 2,000 parts distilled water, after which the solution was cooled to 0° C. To the cooled solution was added 50 parts potassium cyanate in 200 parts water. The reaction mixture was kept at a low temperature for several hours. Finally the mass was heated on a water bath for 2 hours. The reaction product comprising 2-ureido 4,6-diamino 1,3,5-triazine was filtered off, washed free of potassium chloride and dried. Fine, white crystals that sublimed with charring above 280° C. were obtained. This crystalline material had a nitrogen content of 59.1%, which is in close agreement with the theoretical nitrogen content (57.9%) of 2-ureido 4,6-diamino 1,3,5-triazine.

EXAMPLE 3

Preparation of 2,4,6-thioureido 1,3,5-triazine

The same procedure is followed as described under Example 1 with the exception that the halogenated triazine is 2,4,6-trichloro 1,3,5-triazine and the sodium urea is employed in an amount corresponding to 3 mols sodium urea per mol of the said halogenated triazine. The reaction may be represented by the following equation:

V

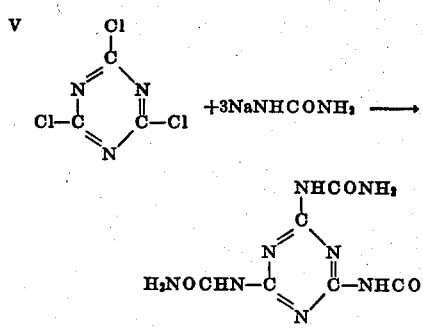

The amino ureido (or thioureido) triazines also may be prepared by causing a polyhalogenated 1,3,5-triazine to react with an alkali-metal urea or thiourea in an amount insufficient to react with all of the halogen atoms of the halogenated triazine. The resulting product then is reacted with ammonia or with an amine to yield the desired amino ureido (or thioureido) triazine.

From the foregoing description it will be seen that the present invention provides new and useful ureido and thioureido triazines, more specific examples of which are shown below:

VI

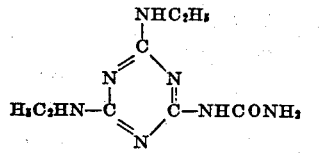

2-ureido 4,6-di-(ethylamino) 1,3,5-triazine

VII

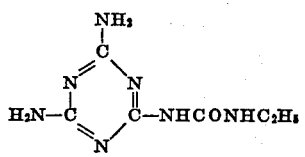

2-(ethyl ureido) 4,6-diamino 1,3,5-triazine

VIII

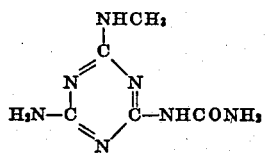

2-ureido 4-amino 6-methylamino 1,3,5-triazine

IX

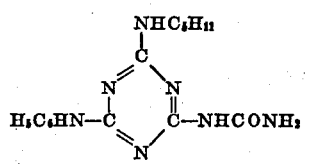

2-ureido 4-phenylamino 6-amylamino 1,3,5-triazine

X

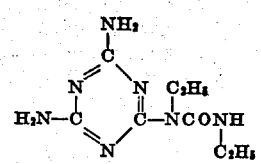

2-(N, N'-diethyl ureido) 4,6-diamino 1,3,5-triazine

XI

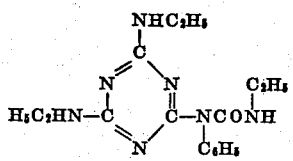

2-(N-phenyl N'-ethyl ureido) 4,6-di-(ethylamino) 1,3,5-triazine

XII

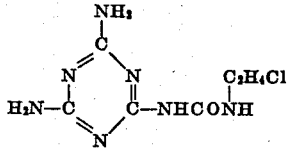

2-(beta-chlorethyl ureido) 4,6-diamino 1,3,5-triazine

XIII

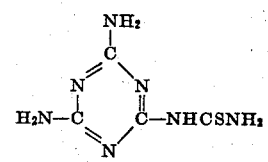

2-thioureido 4,6-diamino 1,3,5-triazine

Other examples are listed below without their formulas, since their formulas will be readily apparent to those skilled in the art from the formulas for the above-mentioned compounds:

2-thioureido 4,6-di-(ethylamino) 1,3,5-triazine
2-thioureido 4-ethylamino 6-phenylamino 1,3,5-triazine
2-(ethyl thioureido) 4,6-di-(phenylamino) 1,3,5-triazine
2-(N,N'-diethyl thioureido) 4,6-diamino 1,3,5-triabine
2-(N-ethyl N'-phenyl thioureido) 4,6-diamino 1,3,5-triazine
2-ureido 4,6-di-(methylamino) 1,3,5-triazine
2-ureido 4,6-di-(cyclohexylamino) 1,3,5-triazine
2-ureido 4,6-di-(chlorphenylamino) 1,3,5-triazine
2-ureido 4,6-di-(chlorethylamino) 1,3,5-triazine In a manner similar to that described above with particular reference to the production of ureido and thioureido 1,3,5-triazines, corresponding asymmetrical and vicinal triazine derivatives may be prepared.

What I claim as new and desire to secure by Letters Patent of the United States is:

1. Chemical compounds corresponding to the general formula

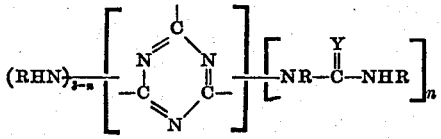

where $n$ is 1, R is a member of the class consisting of hydrogen and monovalent hydrocarbon and halo-hydrocarbon radicals, and Y is a member of the class consisting of oxygen and sulfur.

2. Chemical compounds as in claim 1 wherein R represents hydrogen.

3. Chemical compounds as in claim 1 wherein Y represents oxygen.

4. 2-ureido 4,6-diamino 1,3,5-triazine.

5. 2-thioureido 4,6-diamino 1,3,5-triazine.

6. The method of preparing chemical compounds corresponding to the general formula

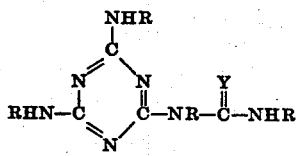

where Y represents a member of the class consisting of oxygen and sulfur and R represents a member of the class consisting of hydrogen and monovalent hydrocarbon and halo-hydrocarbon radicals, said method comprising effecting reaction between (1) a compound corresponding to the general formula

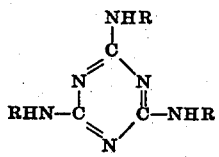

where R has the meaning above given, and (2) a compound selected from the class of compounds corresponding to the general formulas RCNY and RNCY where R and Y have the meanings above given.

7. A method as in claim 6 wherein R represents hydrogen and the reactant of the class consisting of HCNY and HNCY is formed in situ by using a suitable member of the class consisting of the alkali-metal salts, the alkaline-earth salts and the ammonium salts of cyanic, isocyanic, thiocyanic and isothiocyanic acids and by carrying out the reaction in the presence of an inorganic acid.

8. A method as in claim 6 wherein R represents hydrogen and the reactant of the class consisting of HCNY and HNCY is formed in situ by using a suitable member of the class consisting of the alkali-metal salts, the alkaline-earth salts and the ammonium salts of cyanic, isocyanic, thiocyanic and isothiocyanic acids and by using an inorganic acid mono salt of the triamino triazine as a starting reactant.

9. The method of preparing 2-ureido 4,6-diamino 1,3,5-triazine which comprises effecting reaction between an inorganic acid mono salt of melamine and an alkali-metal cyanate.

10. The method of preparing 2-thioureido 4,6-diamino 1,3,5-triazine which comprises effecting reaction between an inorganic acid mono salt of melamine and an alkali-metal isothiocyanate.

11. The method of preparing 2-ureido 4,6-diamino 1,3,5-triazine which comprises effecting reaction between melamine monohydrochloride and potassium cyanate.

12. The method of preparing 2-ureido 4,6-diamino 1,3,5-triazine which comprises adding an aqueous solution of potassium cyanate to an aqueous solution of melamine monohydrochloride that has been cooled to a temperature of the order of 0° C., heating the resulting solution until a reaction mass containing 2-ureido 4,6-diamino 1,3,5-triazine has been formed, and isolating 2-ureido 4,6-diamino 1,3,5-triazine from the said reaction mass.

13. The method of preparing 2-ureido 4,6-diamino 1,3,5-triazine which comprises adding an aqueous solution of potassium cyanate to an aqueous solution of melamine monohydrochloride that has been cooled to a temperature of the order of 0° C., the said reactants being employed in proportions, by weight, corresponding to about 65 parts melamine monohydrochloride to about 50 parts potassium cyanate, effecting reaction between the said reactants first at a low temperature for several hours and then under heat for a period of the order of 2 hours, filtering off the reaction mass containing 2-ureido 4,6-diamino 1,3,5-triazine, ano washing the said mass until free from potassium chloride thereby to obtain purified 2-ureido 4,6-diamino 1,3,5-triazine.

GAETANO F. D'ALELIO.